United States Patent
Hufnagle et al.

(10) Patent No.: US 8,505,940 B1
(45) Date of Patent: Aug. 13, 2013

(54) STABILIZER BAR BUSHING ATTACHMENT ASSEMBLY

(75) Inventors: Edward C. Hufnagle, South Lyon, MI (US); Jose Adrian Paez Morales, De (MX); Jason T. Kline, Lake Orion, MI (US); Peter Massos, Royal Oak, MI (US); Christopher P. Scolaro, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/550,655

(22) Filed: Jul. 17, 2012

Related U.S. Application Data

(60) Provisional application No. 61/621,773, filed on Apr. 9, 2012.

(51) Int. Cl.
*B60G 3/12* (2006.01)
(52) U.S. Cl.
USPC ........ 280/124.13; 280/124.144; 280/124.149; 280/124.152
(58) Field of Classification Search
USPC ........ 280/124.13, 124.144, 124.149, 124.152
See application file for complete search history.

(56) References Cited

U.S. PATENT DOCUMENTS

| | | | |
|---|---|---|---|
| 3,992,036 A * | 11/1976 | Allison | 280/124.137 |
| 6,513,801 B1 * | 2/2003 | McCarthy | 267/293 |
| 7,828,308 B2 * | 11/2010 | Hansson et al. | 280/124.152 |
| 8,292,312 B2 * | 10/2012 | Kato et al. | 280/124.107 |
| 2004/0075235 A1 * | 4/2004 | Cai et al. | 280/124.152 |
| 2006/0208448 A1 * | 9/2006 | Dundon | 280/124.152 |
| 2007/0085295 A1 * | 4/2007 | Johnson et al. | 280/124.152 |
| 2009/0200767 A1 * | 8/2009 | Lim et al. | 280/124.152 |

* cited by examiner

*Primary Examiner* — Toan To
(74) *Attorney, Agent, or Firm* — Quinn Law Group, PLLC

(57) ABSTRACT

A bushing attachment assembly for a vehicle stabilizer bar is provided. The mounting structure includes a bushing, a bracket assembly, and a bracket mount, which may be configured to couple the bracket assembly and bushing to a vehicle frame. The bracket assembly may include an outer pre-compression component and an inner retention component. The bushing may be disposed within a cavity formed between the outer pre-compression component and the inner retention component. The bushing may also define a central bore configured to receive a vehicle stabilizer bar. Each of the respective outer pre-compression and inner retention components may include planar tabs or other similar retention features configured to engage one another to form a compression assembly, which applies and maintains a compressive load upon the bushing.

20 Claims, 6 Drawing Sheets

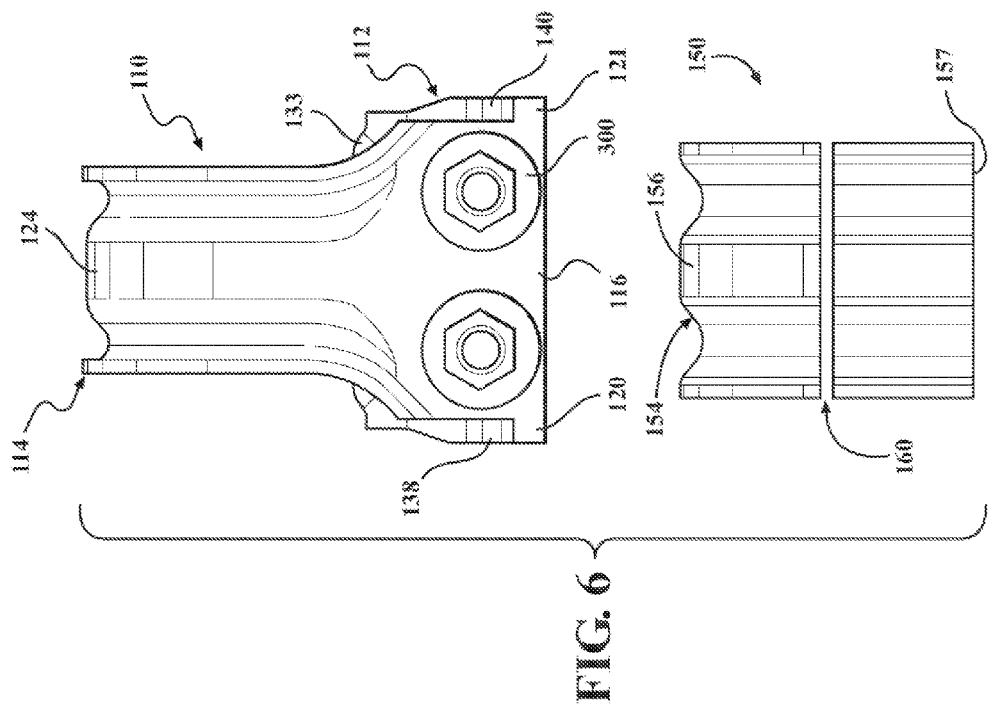
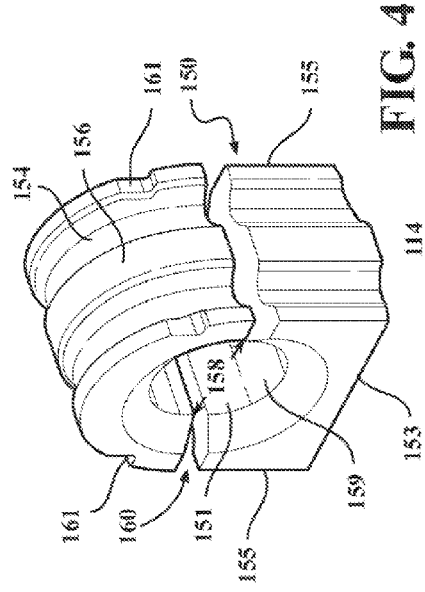
FIG. 4
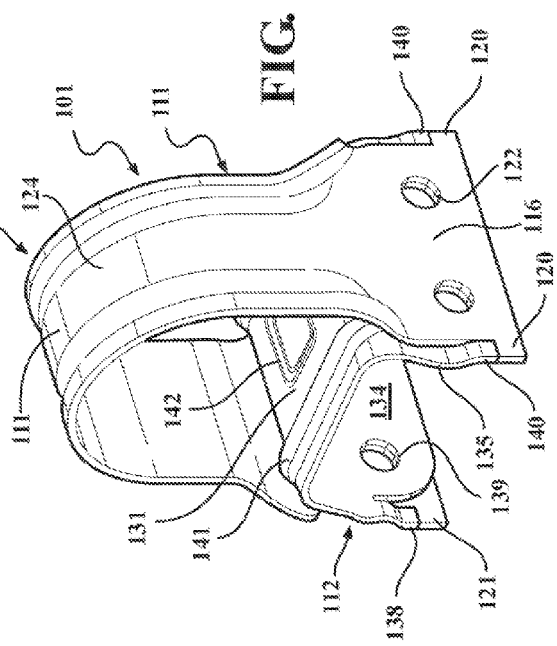
FIG. 5
FIG. 6

STABILIZER BAR BUSHING ATTACHMENT ASSEMBLY

CROSS REFERENCE TO RELATED APPLICATIONS

This application claims the benefit of U.S. Provisional Application No. 61/621,773, filed Apr. 9, 2012, which is hereby incorporated by reference in its entirety.

TECHNICAL FIELD

The invention generally relates to a bushing attachment assembly for a vehicle stabilizer bar.

BACKGROUND

During vehicle motion along a curve, inertia causes the mass of the vehicle to continue in a straight line, away from the direction of the curve, causing the body of the vehicle to sway. This sway, or redistribution of weight, causes compressive force to be applied to the control arm furthest removed from the center of the curve, (i.e. the outer control arm), and expansive force on the control arm nearest the center of the curve, (i.e. the inner control arm).

A stabilizer or sway bar links the inner and outer control arms. During vehicle sway, the stabilizer bar experiences upward movement due to the expansive force applied to the inner control arm and experiences downward movement due to the compressive force applied to the outer control arm, causing axial rotation. The presence of the stabilizer bar lessens the rotational or sway motion of the vehicle frame.

SUMMARY

A mounting structure for attaching a stabilizer bar to a vehicle is provided. The mounting structure includes a bushing, a bracket assembly, and a bracket mount.

The bushing defines a central bore that is configured to receive a vehicle stabilizer bar. The stabilizer bar may be secured within the central bore to form a stabilizer bar assembly.

The bracket assembly may include an outer pre-compression component and an inner retention component, which may be configured to snap fit or otherwise mechanically engage one another to form a compression assembly. The outer pre-compression component may be arcuate in shape, and may include an outwardly facing surface, an inwardly facing surface, and a plurality of outer pre-compression end portions. Each of the respective outer pre-compression end portions may include planar tabs or other similar first retention features configured to engage the inner retention component.

The inner retention component may be formed in a rectangular, arcuate, or other similar partially-closed formation, and may include a first inner retention surface, a second inner retention surface, and a plurality of inner retention end portions. Each of the respective inner retention end portions may include planar tabs or other similar second retention features configured to engage the outer pre-compression component.

The outer pre-compression component may be capable of being secured about the bushing and the inner retention component, allowing for the first and second retention features of each of the respective inner retention component and outer pre-compression component to be snap-fit or otherwise mechanically engaged with one another, forming a two-part, compression assembly. The engagement of the outer pre-compression component and the inner retention component about the bushing creates the necessary amount of compressive force to hold the stabilizer bar and the bushing securely in place.

The bracket mount may include a first flange member and a second flange member, each of the respective first and second flange members may include a receiving end and a connector end. The connector end forms a curvilinear juncture with an outwardly protruding flange portion, for attachment or fixation to a vehicle frame. The inner retention component may be fitted about the receiving ends of the first and second flange members. Each of the respective inner retention component and outer pre-compression component can be fastened to the bracket mount with bolts or other fastening features.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 4 is a perspective view of the bushing.

FIG. 5 is a perspective view of the interconnected bracket assembly.

FIG. 6 is a side elevation view of the bracket assembly and bushing.

DETAILED DESCRIPTION

Those having ordinary skill in the art will recognize that terms such as "above," "below," "downward," "upward," "top," "bottom," etc., are used descriptively for the figures, and do not represent limitations on the scope of the invention.

Figure 9:
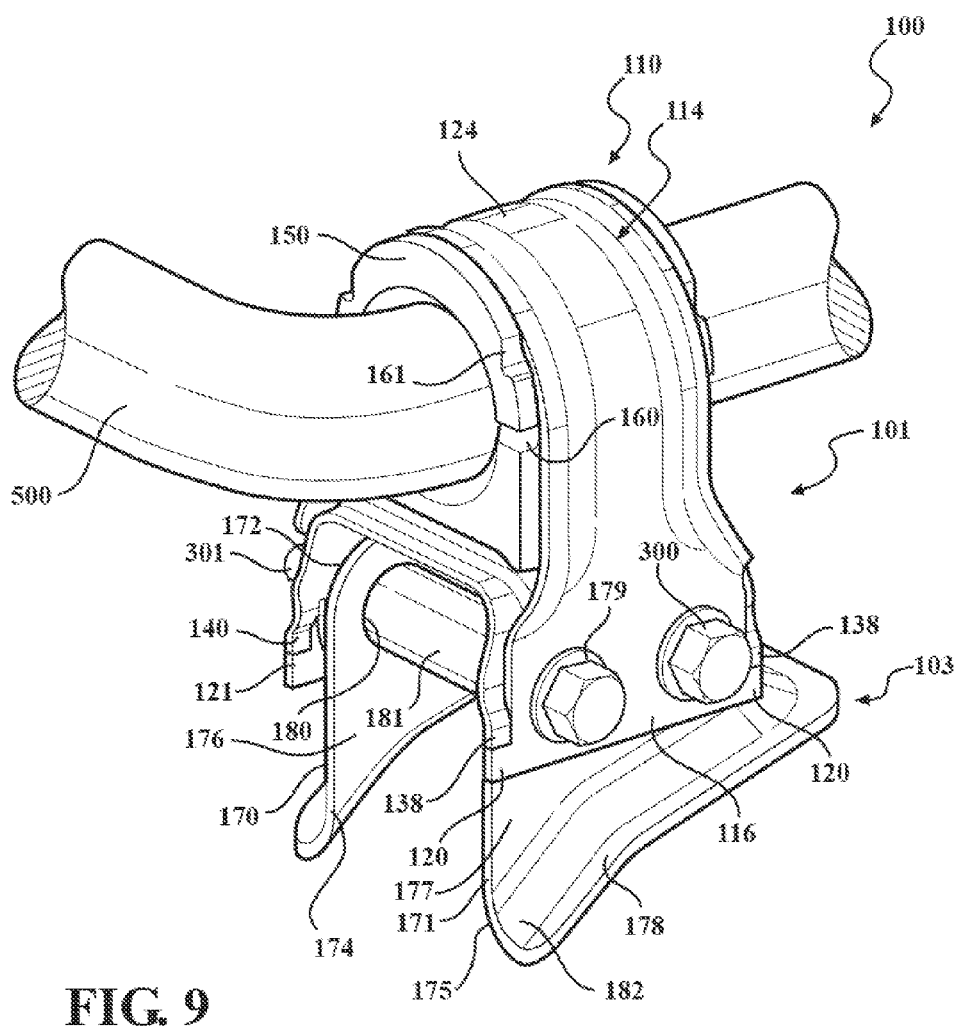
FIG. 9 is a perspective view of the interconnected bracket assembly secured about and interconnected with the bracket mount.

Referring to the Figures, wherein like reference numbers correspond to like or similar components throughout the several views, a mounting structure 100 for attaching a stabilizer bar 500 to a vehicle is shown generally in FIG. 9. The mounting structure 100 generally comprises a bracket assembly 101, a bushing 150, and a bracket mount 103.

Figure 1:
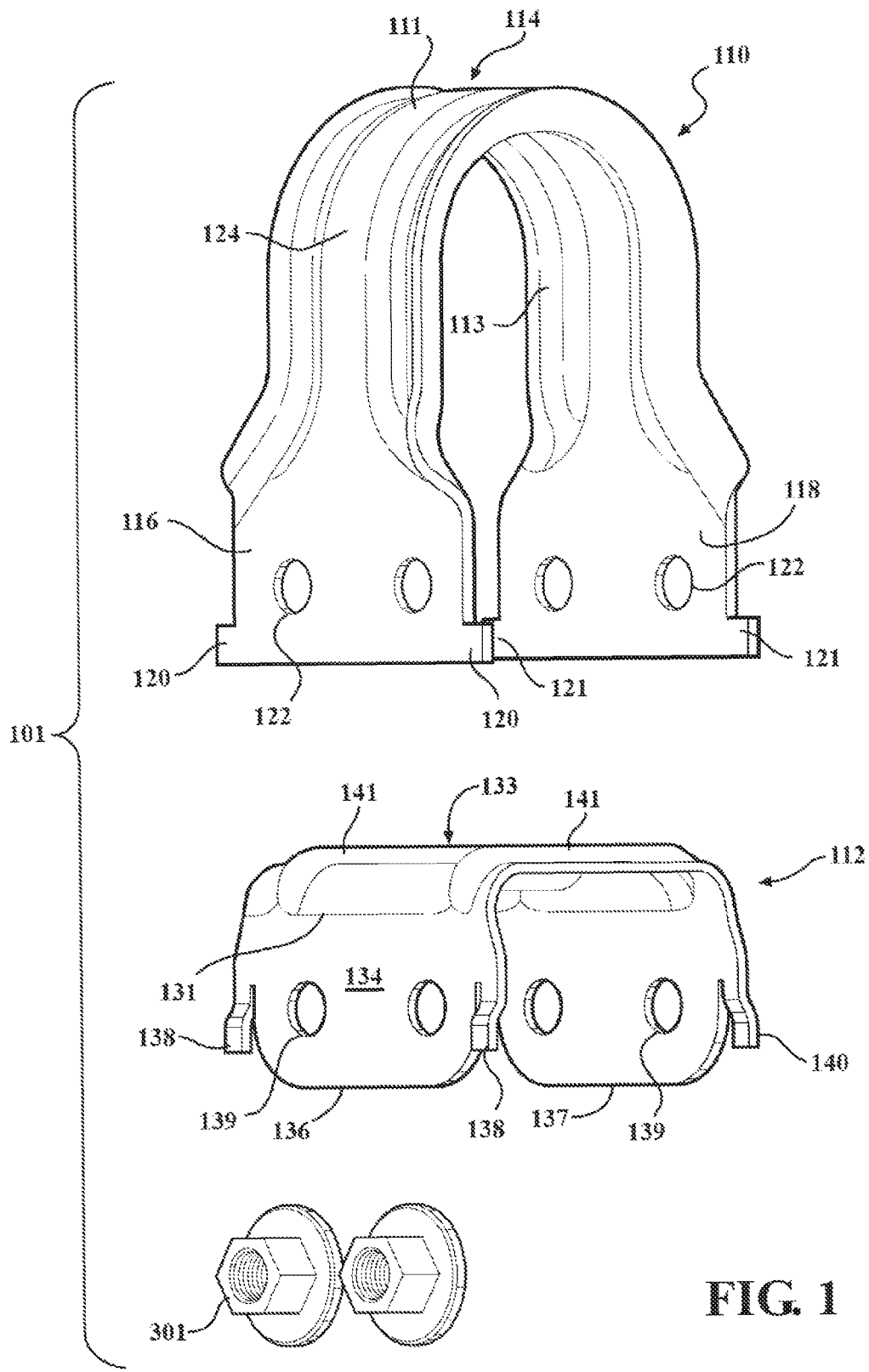
FIG. 1 is an exploded perspective view of the bracket assembly.
Figure 2:
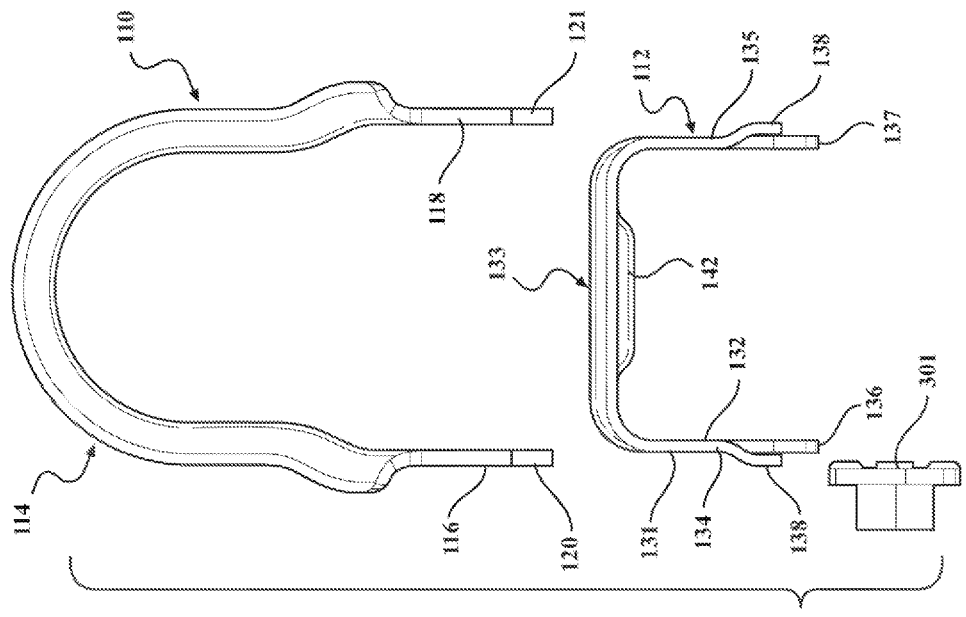
FIG. 2 is an exploded side elevation view of the bracket assembly.
Figure 3:
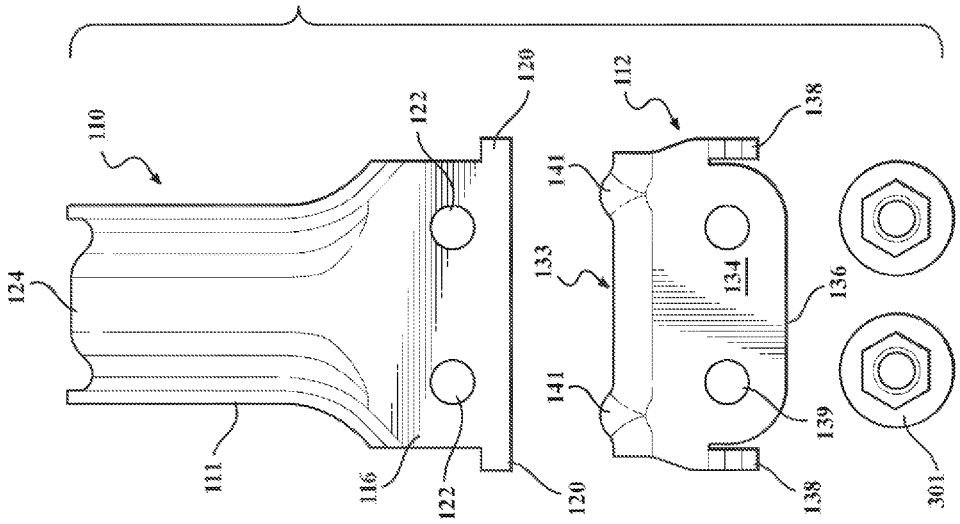
FIG. 3 is an exploded front elevation view of the bracket assembly.

Referring to FIGS. 1-3, the bracket assembly 101 includes an outer pre-compression component 110 and an inner retention component 112. Each of the respective outer pre-compression component 110 and the inner retention component 112 can be formed from traditional materials such as steel, galvanized material, or the like and can be anodized or coated to guard against corrosion.

The outer pre-compression component 110 may include a center portion 114 and a plurality of outer pre-compression end portions 116, 118. The center portion 114 may be arcuate in shape or may be configured in another similar, partially-closed formation. The outer pre-compression component may have an outwardly facing surface 111 and an inwardly facing surface 113. A convex outer pre-compression stability slot 124 may extend outwardly from the outwardly facing surface 111.

The center portion 114, of the outer pre-compression component 110, flares outwardly and terminates at the plurality of outer pre-compression end portions 116, 118. Each of the respective outer pre-compression end portions 116, 118 may include planar tabs or other similar first retention features 120, 121, configured to engage the inner retention component 112. The first retention features 120, 121, may extend horizontally outward from each of the respective outer pre-compression end portions 116, 118. Additionally, each of the respective outer pre-compression end portions 116, 118 define at least one bore hole 122, configured to receive a bolt or other similar fastening feature 300. A welded nut or other securing feature 301, capable of securing the bolt or other fastening feature 300, may be affixed about each of the at least one bore holes 122, for ease in assembly.

The inner retention component 112 may be arcuate in shape or be configured in another similar, partially-closed formation. The inner retention component 112 may be configured to be coupled with the outer pre-compression component 110 and may be secured between the respective outer pre-compression end portions 116, 118. The inner retention component 112 may also include a first inner retention surface 131, a second inner retention surface 132, a center section 133, a first side section 134, and a second side section 135. Each of the respective first and second side sections 134, 135 terminate at one of a plurality of inner retention end portions 136, 137.

Each of the plurality of inner retention end portions 136, 137 may include planar tabs or at least one other similar second retention feature 138, 140. The at least one second retention feature 138, 140 may be configured to engage the at least one first retention feature 120, 121. The at least one second retention feature 138, 140 may extend downward from and perpendicular to each of the inner retention end portions 136, 137.

The first side section 134 and second side section 135, each, respectively, define at least one bore hole 139 for alignment with the at least one bore hole 122 defined by outer pre-compression end portions 116, 118. The at least one bore hole 139 may be configured to receive the bolt or other fastening feature 300.

At least one convex inner retention stability ridge 141 may extend upward from the first inner retention surface 131 and run along the center section 133 of the inner retention component 112. Additionally, a concave inner retention stability slot 142 may extend into and downward from the second inner retention surface 132.

Referring to FIG. 4, a stabilizer bar bushing 150 is shown. The stabilizer bar bushing 150 can be formed of elastomeric material such as rubber or the like, or any other material having a density selected to resist thermal breakdown and prevent undue mechanical deformation while maintaining a secure and snug fit between the stabilizer bar 500 and a bracket assembly 101. The bushing may include a first bushing surface 154 and a second bushing surface 153, and at least two opposing bushing faces 155. At least one notch 161, may be defined by each of the at least two opposing bushing faces 155.

At least one convex first bushing stability ridge 156 may extend upward from the first bushing surface 154. At least one convex second bushing stability ridge (not shown) may extend downward from the second bushing surface 153.

The bushing 150 may define a central bore 151 configured to receive a vehicle stabilizer bar 500. The central bore 151 may define an inner diameter 158, which provides an inner bushing surface 159. The bushing 150 may define at least one opening or slit 160 between the first bushing surface 154 and the second bushing surface 159.

The at least one opening or slit 160 may be configured for ease of insertion of the vehicle stabilizer bar 500 during assembly. In one configuration, the stabilizer bar 500 may be forcibly inserted into the inner diameter 158 of the bushing 150 through the opening or slit 160, allowing the stabilizer bar 500 to seat within the inner diameter 158 contacting nearly the entire inner bushing surface 159. The vehicle stabilizer bar 500 may be secured to the inner bushing surface 159 of the central bore 151 by bonding or another securing process.

Referring to FIGS. 5-8, one configuration, wherein the bracket assembly 101 components and bushing 150 are interlocked, is shown. The outer pre-compression component 110 and inner retention component 112 may engage to form the bracket assembly 101. In the interlocked arrangement, the bracket assembly 101 defines a cavity between the outer pre-compression component 110 and the inner retention component 112. In this configuration, the bushing 150 is disposed within the cavity formed between the outer pre-compression component 110 and the inner retention component 112. The at least one convex second bushing stability ridge (not shown) may interconnect with the at least one concave inner retention stability slot 142. The at least one convex first bushing stability ridge 156 may interconnect with the at least one convex outer pre-compression stability slot 124.

In the interlocked arrangement of one configuration, the planar tabs or other first retention features 120, 121 of the outer pre-compression component 110 may engage the planar tabs or other second retention features 138, 140 of the inner retention component 112, creating an interlock or other mechanical engagement, which provides a compressive force upon the bushing 150 between the inwardly facing surface 113 of the outer pre-compression component 110 and the first inner retention surface 131. The mechanical engagement of the planar tabs 120, 121, 138, 140, or other first and second retention features, secures the respective first and second bushing stability ridges 156, (not shown) within the inner retention stability slot 142 and the outer pre-compression stability slot 124.

Further, in the interlocked arrangement of one configuration, the at least one bore hole 122 of the outer pre-compression component 110 and the at least one bore hole 139 of the inner retention component 112 align along with the welded nut or other securing feature 301 and may be configured to receive the bolt or other fastening feature 300.

Figure 7:
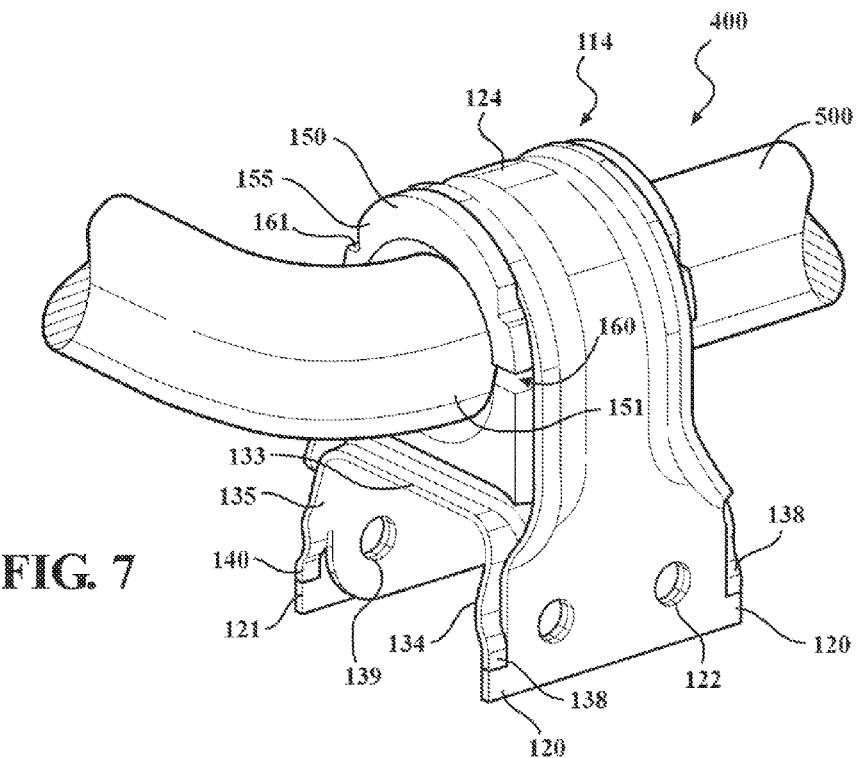
FIG. 7 is a perspective view of the interconnected bracket assembly fitted about the bushing and stabilizer bar.
Figure 8:
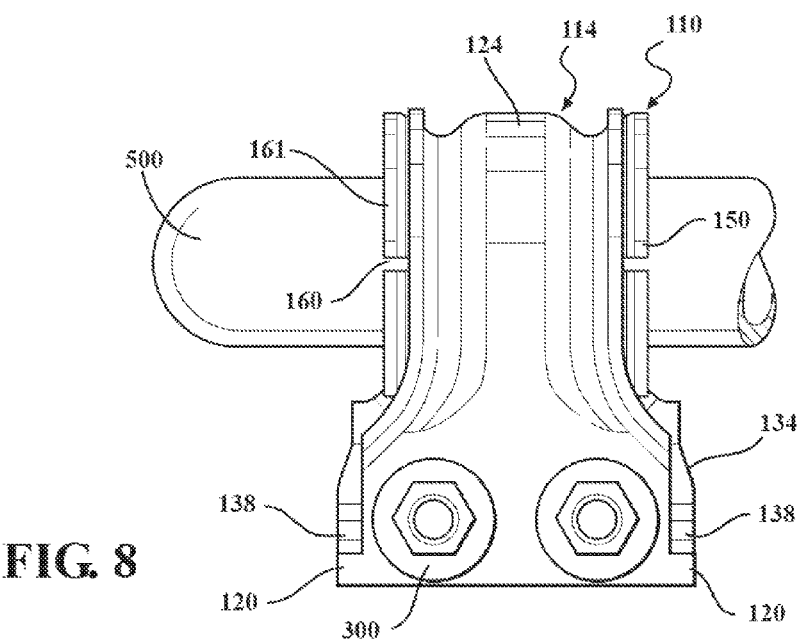
FIG. 8 is a side elevation view of the interconnected bracket assembly fitted about the bushing and stabilizer bar.

In the interlocked arrangement, the combination of the bracket assembly 101, the bushing 150, and stabilizer bar 500 may be interlocked together to form a stabilizer bar bracket assembly 400, shown in FIG. 7.

Figure 10:
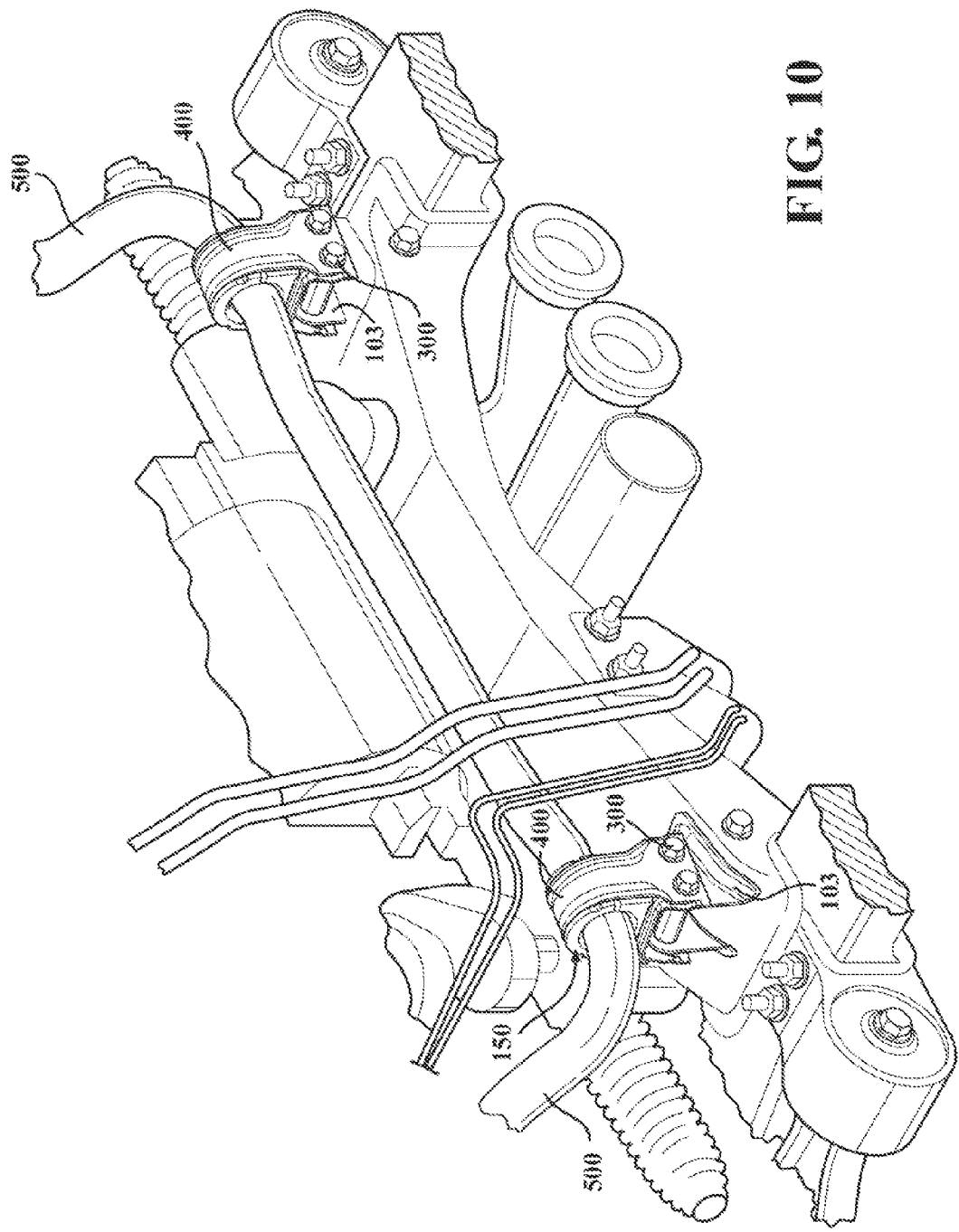
FIG. 10 is an assembly perspective view of the bushing attachment assembly showing a stabilizer bar secured to the frame of a vehicle.

Referring to FIGS. 9 and 10, the bracket mount is shown at 103. The bracket mount 103 can be formed of traditional material such as steel, other galvanized material, or the like and can be anodized or coated to guard against corrosion. The bracket mount 103 may include a first flange member 170 and a second flange member 171, each having a receiving end 172, (not shown) and a connector end 174, 175, an inner flange surface 176 and an outer flange surface 177. The connector ends 174, 175 form a curvilinear juncture 182 with an outwardly protruding flange portion 178. The outwardly protruding flange portion 178 may be affixed to the vehicle frame by welding or another similar affixing process. The first flange member 170 and second flange member 171, respectively, each define at least one bore hole 179, 180 proximate the receiving ends 172, (not shown). The at least one bore hole 179, 180 of the first flange member 170 and second flange member 171, each respectively, may be configured to receive the bolt or other fastening feature 300, which can secure the stabilizer bar bracket assembly 400 to the bracket mount 103. The at least one bore hole 179 of the first flange member 170 may be interconnected with the at least one bore hole 180 of the second flange member 171 by a sleeve 181.

In one configuration, shown in FIG. 9, the stabilizer bar bracket assembly 400 may be fitted about the first 170 and second 171 flange members of the bracket mount 103. The second inner retention surface 132 may be placed in contact with each of the respective outer flange surfaces 177. The at least one bore hole 122 defined by each of the plurality of outer pre-compression end portions 116, 118 may align with the at least one bore hole 139 defined by the first side section 134 and a second side section 135 of the inner retention component 112. The at least one bore holes 122, 139 of the outer pre-compression component 110 and the inner retention component 112 may be aligned with the at least one bore holes 179, 180 defined by the first 170 and second 171 flange members of the bracket mount 103.

The bolt or other fastening feature 300 is capable of fastening the stabilizer bracket assembly 400 to the bracket mount 103, and may be configured to run horizontally through the aligned bore holes 122, 139, 179, 180, through the sleeve 181. The bolt or other fastening feature 300 may be secured within the sleeve 181 by the welded nut or other securing feature 301.

In this configuration, as depicted in FIG. 10, the vertical profile of the stabilizer bar bracket assembly 101 allows the stabilizer bar 500 to avoid potential interference with other vehicular components, as well as conserves front end packaging space through the use of horizontally orientated fastening features 300.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A bushing attachment assembly for a vehicle stabilizer bar comprising:
   a bracket assembly including:
      an outer pre-compression component having at least two outer pre-compression end portions, each of the outer pre-compression end portions including at least one first retention feature, and
      an inner retention component having at least two inner retention end portions, each of the inner retention end portions including at least one second retention feature, the inner retention component coupled with the outer pre-compression component and secured between the respective outer pre-compression end portions, the inner retention component and outer pre-compression component defining a cavity therebetween;
   an annular bushing disposed within the cavity formed between the outer pre-compression component and the inner retention component, the annular bushing having a first bushing surface in contact with the outer pre-compression component, a second bushing surface in contact with the inner retention component, and at least two opposing bushing faces, the annular bushing defining a central bore extending longitudinally between the at least two opposing bushing faces; and
   wherein the at least one first retention feature is configured to engage the at least one second retention feature to secure the annular bushing between the outer pre-compression component and the inner retention component, the outer pre-compression component applying and maintaining a compressive load upon the first bushing surface and the inner retention component applying and maintaining a compressive load upon the second bushing surface.

2. The bushing attachment assembly of claim 1 wherein each of the outer pre-compression end portions and each of the inner retention end portions define at least one bore hole.

3. The bushing attachment assembly of claim 2, further comprising:
   a bracket mount including a first flange member, a second flange member, and an outwardly protruding flange portion, each of the respective first flange member and second flange member having a receiving end and a connector end, and defining at least one bore hole, the outwardly protruding flange portion configured to extend from the connector ends of each of the respective first flange member and second flange member;
   at least one fastening feature configured to couple the bracket assembly and annular bushing to the bracket mount, the at least one fastening feature secured within the at least one bore holes defined by the outer pre-compression end portions, the at least one bore holes defined by the inner retention end portions, and the at least one bore holes defined by each of the respective first and second flange members.

4. The bushing attachment assembly of claim 1, wherein the outer pre-compression component has an outwardly facing surface and an inwardly facing surface, the outwardly facing surface defining at least one convex outer pre-compression stability slot that extends radially outward from and along the length of the outwardly facing surface.

5. The bushing attachment assembly of claim 4, wherein the inner retention component has a first inner retention surface and a second inner retention surface, the second inner retention surface defining at least one concave inner retention stability slot that extends downward from the second inner retention surface.

6. The bushing attachment assembly of claim 5, wherein the first inner retention surface defines at least one convex inner retention stability ridge that extends outwardly from the first inner retention surface.

7. The bushing attachment assembly of claim 4, wherein the first bushing surface defines at least one convex first bushing stability ridge extending outwardly from the first bushing surface.

8. The bushing attachment assembly of claim 7, wherein the second bushing surface defines at least one convex second bushing stability ridge extending outwardly from the second bushing surface.

9. The bushing attachment assembly of claim 8, wherein the outer pre-compression stability slot is configured to receive the first bushing stability ridge extending from the first bushing surface.

10. The bushing attachment assembly of claim 9, wherein the inner retention stability slot is configured to receive the second bushing stability ridge extending outwardly from the second bushing surface.

11. The bushing attachment assembly of claim 1, further comprising, in combination, a vehicle stabilizer bar and wherein the central bore defines an inner bushing surface and the annular bushing defines an opening between the first bushing surface and the inner bushing surface, for receiving the vehicle stabilizer bar.

12. The bushing attachment assembly of claim 11, wherein the vehicle stabilizer bar is bonded to the inner bushing surface.

13. The bushing attachment assembly of claim 3, wherein the bracket mount further comprises a sleeve, the sleeve configured to align and interconnect the at least one bore hole defined by the first flange member and the at least one bore hole defined by the second flange member.

14. The bushing attachment assembly of claim 13, wherein the second inner retention surface is fitted about the receiving ends of each of the respective first flange member and second flange member.

15. The bushing attachment assembly of claim 14, wherein the at least one bore holes defined by each of the respective first and second flange members, the at least one bore holes defined by the inner retention end portions, the at least one bore holes defined by the outer pre-compression end portions, and the sleeve of the bracket mount are aligned and configured to receive the at least one fastening feature.

16. The bushing attachment assembly of claim 1, wherein the outer pre-compression component is a stamped outer pre-compression component.

17. The bushing attachment assembly of claim 1, wherein the inner retention component is a stamped inner retention component.

18. The bushing attachment assembly of claim 3, wherein the at least one fastening feature is configured to be secured by a securing feature, the securing feature being secured to the one of the end portions of the outer pre-compression component about the at least one bore hole.

19. The bushing attachment assembly of claim 18, wherein the fastening feature is a bolt and the securing feature is a welded nut.

20. A vehicle comprising:
a vehicle frame;
a bushing attachment assembly including:
a bracket assembly including:
an outer pre-compression component having at least two outer pre-compression end portions, each of the outer pre-compression end portions include at least one first retention feature, and
an inner retention component having at least two inner retention end portions, each of the inner retention end portions including at least one second retention feature, the inner retention component configured to be coupled with the outer pre-compression component and secured between the respective outer pre-compression end portions, the inner retention component and outer pre-compression component defining a cavity therebetween;
an annular bushing disposed within the cavity formed between the outer pre-compression component and the inner retention component, the annular bushing having a first bushing surface in contact with the outer pre-compression component, a second bushing surface in contact with the inner retention component, and at least two opposing bushing faces, the annular bushing defining a central bore extending longitudinally between the at least two opposing bushing faces;
a vehicle stabilizer bar configured to be secured within the central bore of the bushing;
a bracket mount configured to couple the bushing attachment assembly to the vehicle frame, the bracket mount including:
a first flange member, a second flange member, and an outwardly protruding flange portion, each of the respective first flange member and second flange member having a receiving end and a connector end, and defining at least one bore hole, the outwardly protruding flange portion configured to extend from the connector ends of each of the respective first flange member and second flange member;
at least one fastening feature configured to couple the bracket assembly and annular bushing to the bracket mount, the at least one fastening feature secured within the at least one bore holes defined by the outer pre-compression end portions, the at least one bore holes defined by the inner retention end portions, and the at least one bore holes defined by each of the respective first and second flange members; and
wherein the at least one first retention feature is configured to engage the at least one second retention feature to secure the annular bushing between the outer pre-compression component and the inner retention component, the outer pre-compression component applying and maintaining a compressive load upon the first bushing surface and the inner retention component applying and maintaining a compressive load upon the second bushing surface.

* * * * *